April 12, 1960 H. RABEZZANA 2,932,230
ROTARY TUBE CUTTER WITH RECIPROCATING FEED
Filed March 30, 1956 7 Sheets-Sheet 1

FIG. 1

INVENTOR.
Hector Rabezzana
BY
George W. Talbutt
ATTORNEY

April 12, 1960      H. RABEZZANA      2,932,230
ROTARY TUBE CUTTER WITH RECIPROCATING FEED
Filed March 30, 1956      7 Sheets-Sheet 2

INVENTOR.
Hector Rabezzana.
BY
George W. Talbutt
ATTORNEY.

April 12, 1960  H. RABEZZANA  2,932,230
ROTARY TUBE CUTTER WITH RECIPROCATING FEED
Filed March 30, 1956  7 Sheets-Sheet 7

INVENTOR.
Hector Rabezzana.
BY
George W. Talbutt
ATTORNEY.

United States Patent Office 2,932,230
Patented Apr. 12, 1960

2,932,230

ROTARY TUBE CUTTER WITH RECIPROCATING FEED

Hector Rabezzana, Fenton, Mich.

Application March 30, 1956, Serial No. 575,069

5 Claims. (Cl. 83—214)

This invention relates to a machine for quickly, accurately and continuously cutting predetermined lengths of tubing from a long length of tubing stock progressively fed into the machine by automatic means. This invention is particularly concerned with the mechanism for feeding the length of tubing stock to the associated clamping jaws, the mechanism for operating the clamping jaws, the clamping jaws per se, the tube cutters and the means for operating the tube cutters.

It is a primary object of this invention to provide a tube cutting machine wherein the mechanism for feeding the tubing to the cutter clamping jaws is simple and foolproof and of such a construction that it insures a high degree of accuracy in the lengths of tubing that are fed to and successively cut by the machine.

It is another object of this invention to provide an improved type of sectionalized clamping jaw for a tube cutter, pipe cutter or the like.

It is still another object of this invention to provide an improved type of tube cutting mechanism wherein the cut lengths of tubing have smooth, shear cut, end edges that are free of burrs, steps, tears, or the like.

It is still another object of this invention to provide a tube cutting machine that is readily adapted to accommodate a wide range of tube diameters as well as a wide range of tube wall thicknesses and yet one in which accurate lengths and clean end cuts of the tubing will be assured.

It is a further object of this invention to provide a tube cutter and clamping jaw arrangement that lends itself to magazine feeding of the tube stock.

It is still another object of this invention to provide an arrangement of rotary tube cutters whereby the direction of rotation of the simultaneously acting cutters tends to prevent rotation of the work stock with the result that a minimum clamping pressure is required to hold the work stock and deformation of the work piece is thereby eliminated.

It is still another object of this invention to provide a tube cutting machine wherein tube lengths may be cut accurately and at high speed and wherein the machine elements are arranged so as to be of minimum weight and expense while having maximum service life.

It is still another object of this invention to provide a three-section pipe or tube clamping jaw that has actuating mechanism associated therewith to insure easy feeding of the work stock to the jaw, cause firm gripping of the work stock at minimum pressures to eliminate damage thereto during cutting of the stock, and will insure easy removal of the work stock from the jaws on opening thereof.

It is still another object of this invention to provide a novel rotating tube cutter mechanism that is timed to the tube feeding and the tube clamping mechanisms.

Other objects and advantages of this invention will become readily apparent from a consideration of the following description and the related drawings wherein:

Fig. 2 is an enlarged, top plan elevational view of the left end and central portion of the machine shown in Fig. 1;

Fig. 3 is an enlarged top plan elevational view of the right end of the machine shown in Fig. 1;

Fig. 9 is a sectional elevational view of a magazine feed associated with a machine of the type shown in Fig. 1;

One method of successfully severing lengths of tubing is shown in Grieder U.S. Patent 2,572,137 and it consists of first making a tangential cut transversely across a portion of the tube and then after withdrawing the cutter blade causing a knife-like punch to be pressed through the initial cut and through the remainder of the tube aligned with the initial cut to cleanly sever the tubing. A study of the aforementioned patent will show that complicated, relatively heavy, costly machinery is used to effect tube cutting in accordance with the method disclosed in the noted patent. This invention pertains to several improvements over the Grieder patented construction whereby simplified, less expensive, faster operating mechanisms have been developed to produce accurately cut tubing at an increased rate. While this invention is particularly suited for use in machines of the Grieder type, still, there is no intention to restrict this invention to any particular type of machine or operation except as limited by the claims appended hereto.

Figure 1:
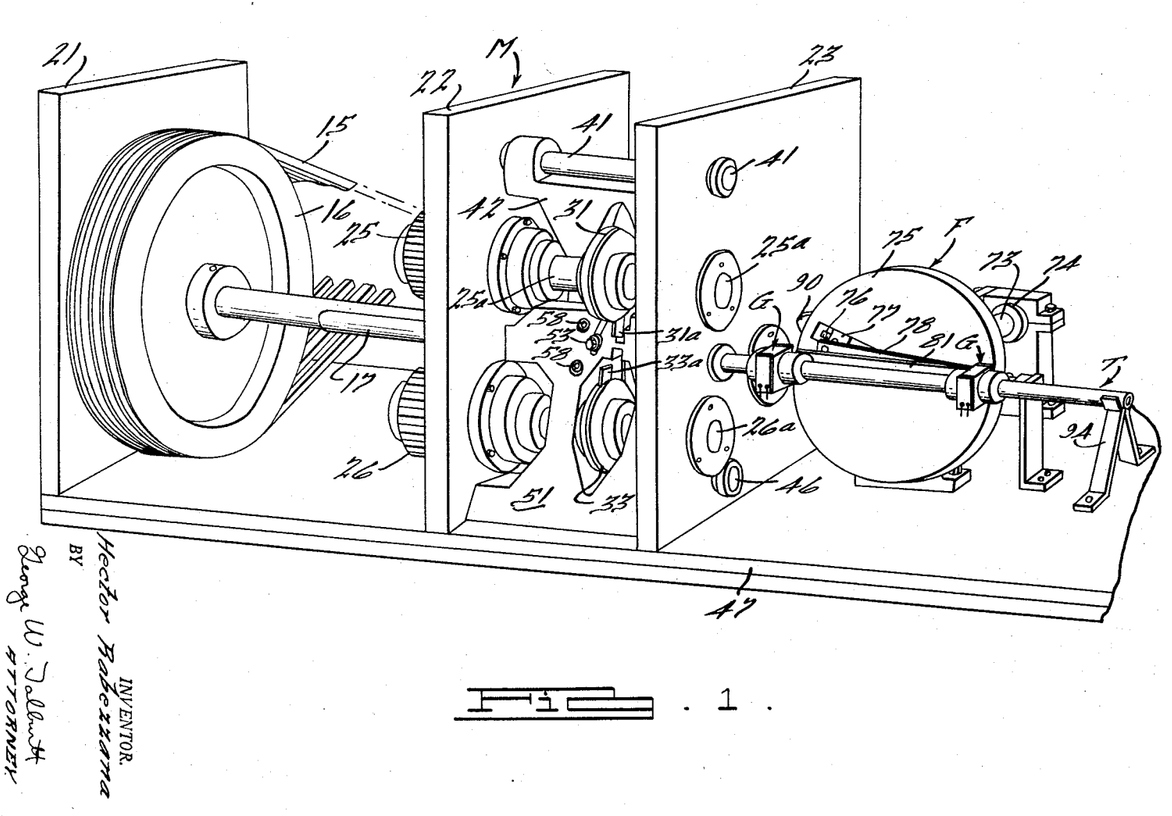
Fig. 1 is a front perspective view of a tube cutting machine embodying this invention.

Fig. 1 shows in perspective a tube cutting machine M that can be driven from any suitable source of power, not shown, such as a gas engine or electric motor. The available power source is connected to machine M through a belt drive means 15. Belt drive means 15 is connected to the rotatable flywheel 16 that is drivingly connected to the main drive shaft 17 of the tube cutting machine M. Main drive shaft 17 extends the full length of the machine M (see Figs. 1, 2 and 3) and is journalled in suitable bearings in each of the frame bulkheads 21, 22 and 23.

Figure 7:
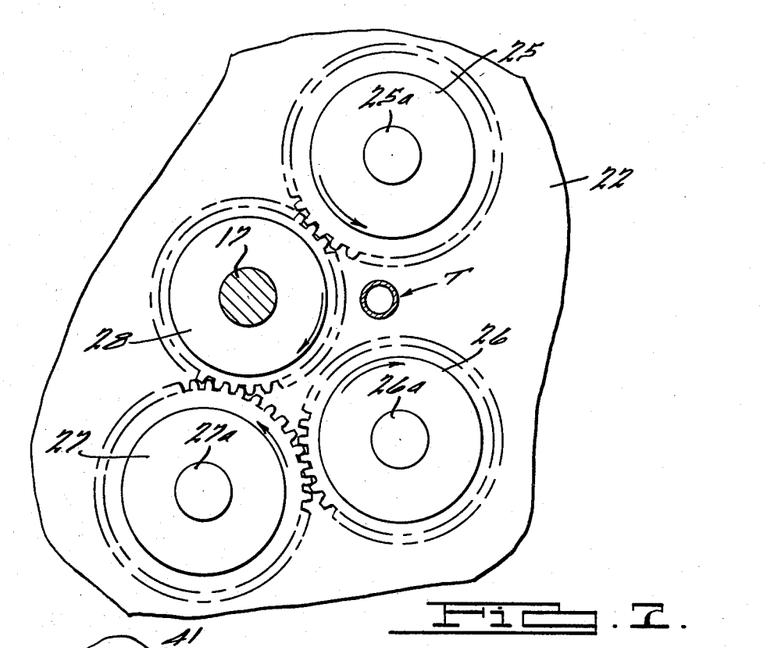
Fig. 7 is a sectional elevational view taken along the line 7—7 of Fig. 2 and looking in the direction of the arrows.

Rotatably mounted on the middle bulkhead 22 (see Fig. 7) are three gears 25, 26 and 27 each of which is drivingly connected to a rotatable shaft 25a 26a, and 27a respectively. The main drive shaft 17 has drivingly connected thereto the gear 28 that is meshingly engaged with and arranged between the gears 25 and 27. By this gearing arrangement the drive shaft 17 causes each of the shafts 25a and 27a to rotate in directions opposite to the direction of rotation of the main drive shaft 17. The gear 26, that is spaced from and not directly engaged with the drive shaft gear 28, is meshingly engaged with the gear 27 so that its shaft 26a rotates in the same direction as drive shaft 17.

Figure 8:
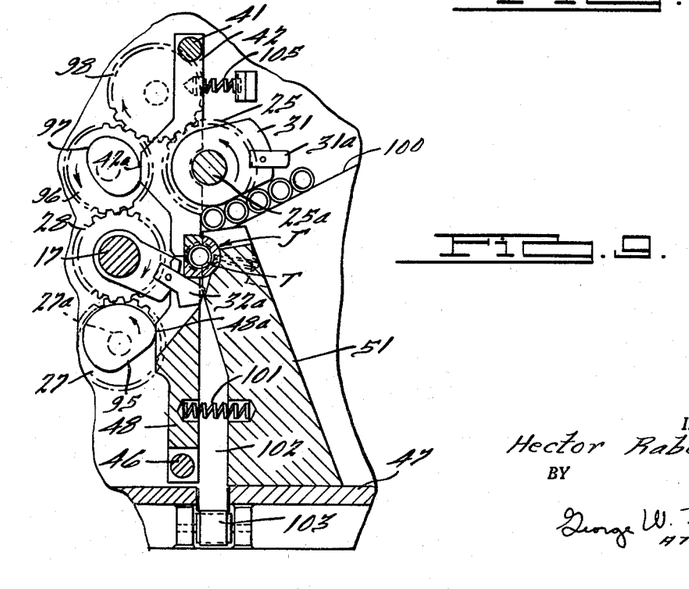
Fig. 8 is a sectional elevational view taken along line 8—8 of Fig. 2.

Drivingly mounted on the rotatable shafts 25a, 17 and 26a, intermediate the bulkheads 22 and 23, are the tube cutter discs 31, 32 and 33 respectively. The several cutters 31, 32 and 33 can be continuously rotated at high speed so that clean, accurate, fast cuts are made across the tube T. Due to the fact that the cutter shafts 25a, 17, 26a are supported at several points along their lengths by the closely spaced bulkheads 21, 22, 23 and also due to the fact that these cutter shafts are mounted in ball bearing shaft supporting assemblies (see Fig. 8) carried by the bulkheads 21, 22, 23, this machine is extremely rigid and is free of any shaft play that would require periodic maintenance adjustments or reduce the life of the machine and particularly the cutter blades.

Figures 5, 6, 6A:
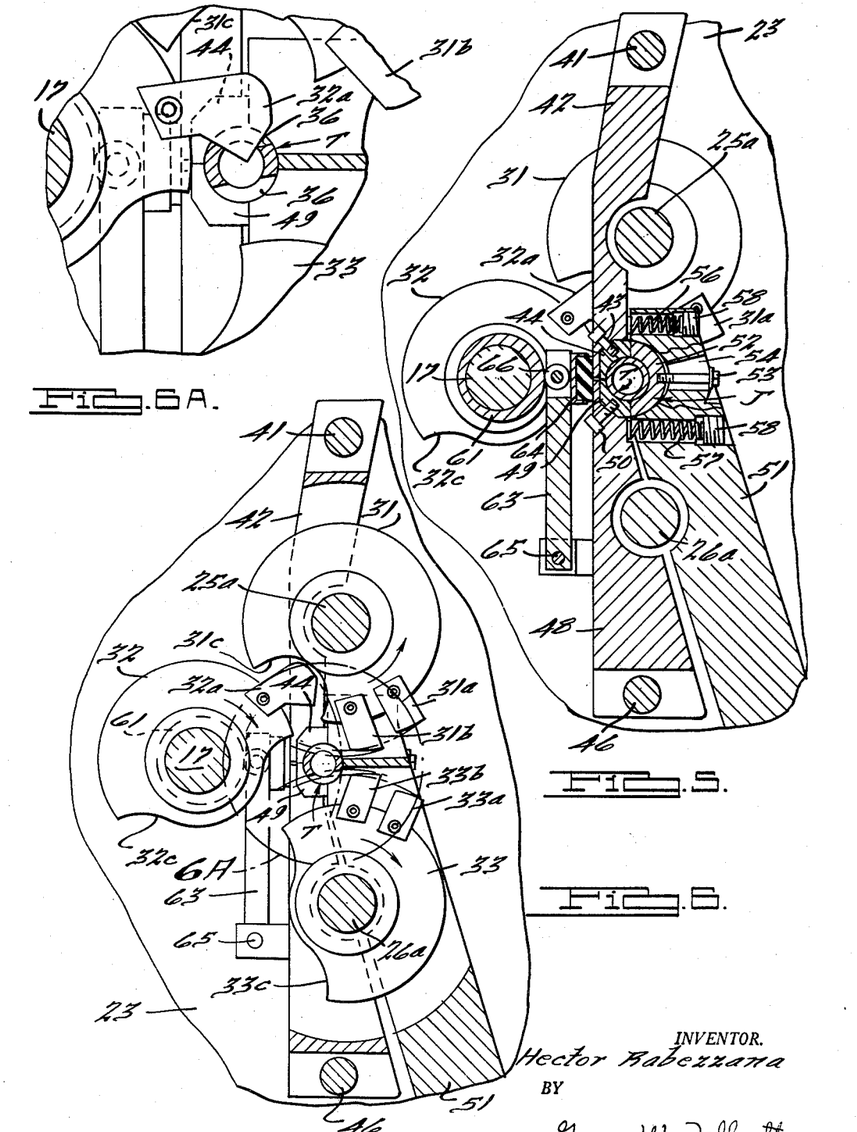
Fig. 5 is a sectional elevational view taken along the line 5—5 of Fig. 2 and looking in the direction of the arrows.
Fig. 6 is a sectional elevational view taken along the line 6—6 of Fig. 2 and looking in the direction of the arrows.
Fig. 6a is an enlarged fragmentary view of the tube and associated cutters shown within circle 6A of Fig. 6.

From Fig. 6 it will be noted that the cutter discs 31 and 33 each include a pair of radially extending cutter blades 31a, 31b and 33a, 33b respectively. The blades 31b and 33b extend radially outwardly a little further than the blades 31a and 33a respectively so that a two stage or two step cut can be made rather than taking the complete cut with one blade. This has less tendency to dent or tear the tube stock during cutting thereof and furthermore it applies less shock to the machine cutter blades, bearings, shafts, and associated elements. It is thought to be obvious that if a very thin-walled tube is to be severed that only a single cutter blade need be used (see Figs. 9–11). The blade elements may be detachably connected to the discs 31, 32, 33 by bolts or the like.

It will also be noted from Fig. 6 that cutter discs 31, 33 are rotating in opposite directions with the tube T positioned between the two cutter discs 31, 33. As a result of this arrangement, the cutter blades on cutter discs 31, 33 each slice out a notch 36 that extends tangentially across the top and the bottom of the tube T (see Fig. 6a). Because the blades of the cutters 31, 33 are applied to the tube T at substantially the same time and are rotating in opposite directions and because these cutter blades are located above and below the tube T, the forces applied to the tube T by the cutters tending to rotate it in its supporting jaws J, J (see Figs. 2 and 5) counteract one another and there is little tendency for the tube T to rotate during the cutting process. As a result of this arrangement, there are practically no turning moments applied to the tube T, during the slicing of the notches 36 in the upper and lower walls thereof, and such smaller forces are required to firmly hold the tube T in its jaw clamps J, J during the cutting process. Accordingly, the tube clamping jaws J, J are less likely to cause deformation or damage to the tube during the tube cutting operation. It will be noted that the cutter discs 31 and 33 have certain portions thereof cut away so that these discs are not actually of circular configuration. The cut away portions 31c, 33c are to provide clearance space for the passage of the rotating tube piercing punch 32a.

From Figs. 6 and 6a it will be noted that after slicing of the notches 36 across the top and bottom surfaces of the tube T, there is then inserted through the top notch 36 a pointed punch 32a. Punch 32a projects radially from the disc 32 that is drivingly connected to the main drive shaft 17. As the drive shaft 17 has the heavy flywheel 16 mounted thereon the momentum of the shaft 17 and its punch 32a is quite large and the punch 32a can easily be pressed through the remaining uncut portion of the tube T. Due to the pointed shape of the punch 32a, it shears the uncut tube wall portions radially outwardly as the punch 32a is rotated downwardly through the tube T. This shearing action of the punch 32a leaves a very clean cut across the tube that is substantially free of burrs or torn portions. The cooperative action of the constantly rotating cutter blades 31a, 31b and 33a, 33b with the rotating punch 32a provides a tube severing mechanism that is far superior to the reciprocating action of the cutter elements shown in the Grieder U.S. Patent 2,572,137.

It will be noted that the rotatable disc 32 that carries the punch 32a has certain portions 32c cut away to provide clearance for the rotating cutter blades 31a, 31b and 33a, 33b. While the various cutter discs 31, 32 and 33 are not symmetrically shaped because of their clearance spaces, still, it is obvious that weights can be added to the discs 31, 32 and 33 to balance them statically and dynamically.

In addition to the novel cutter arrangement hereinbefore described, this invention includes an improved type of clamping jaw J, J for holding the tube T during the cutting operation. This tube holding mechanism is designed to be used in either a machine where the tube T is pushed or slid longitudinally through the clamping jaws (see Fig. 5) or in a magazine feed type machine (see Figs. 9–11) where the tube stock T rolls into the jaws from a position thereabove and is discharged from the lower side of the jaws into a chute arranged therebelow.

Figure 4:
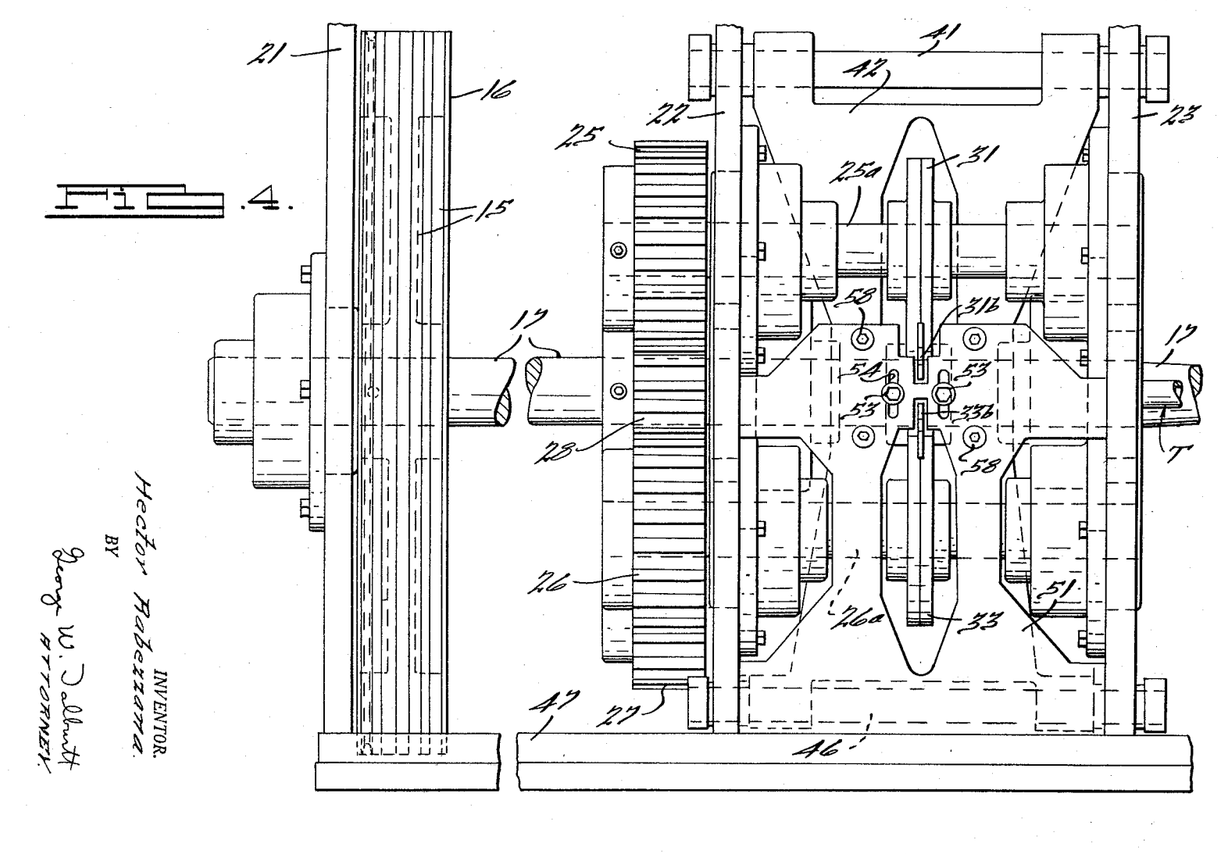
Fig. 4 is a front elevational view, on an enlarged scale, of the left end of the machine shown in Fig. 1, certain portions being broken away for the sake of space conservation.

Looking at Figs. 5, 2 and 4 particularly, it will be seen that a pivot shaft 41 extends between the machine frame bulkheads 22, 23 and this shaft pivotally supports the depending jaw plate 42. Jaw plate 42 has detachably connected to its lower edge by bolts 43 a pair of spaced apart jaw sections 44 that are adapted to receive about one quarter of the outer peripheral surface of spaced apart portions of the tubing T. From Fig. 2 it will be apparent that the spaced jaw sections 44 are located on opposite sides of the cutter discs 31–33.

A second jaw supporting pivot shaft 46 extends between the frame bulkheads 22, 23 adjacent the frame base plate 47. Shaft 46 pivotally supports the jaw plate 48 that projects upwardly therefrom. Jaw plate 48 mounts on its upper edge a pair of spaced apart jaw sections 49 that are shaped and proportioned to receive a little more than one-quarter of the peripheral surface of the tube T. Mounting bolts 50 connect the jaw sections 49 to the jaw plate 48. It is obvious that the jaw sections 44, 49 of the jaw plates 42, 48 can be readily removed and other jaw sections attached in their places to receive other size tubes.

Cooperating with the pivotally mounted jaw plates 42, 48 is a fixed jaw plate 51 that is carried by the base plate 47. Fixed jaw plate 51 has adjustably connected to its upper edge portion a pair of spaced apart jaw sections 52. Jaw sections 52 are shaped and proportioned to receive almost one-half of the outer peripheral surface of the tube T. Bolts 53, which are mounted in plate slots 54, adjustably connect the jaw sections 52 to the jaw plate 51. Due to the pivoted jaw sections 44, 49 coacting to receive slightly more than one-half of the outer circumference of the tube T and the fixed jaw section 52 receiving slightly less than one-half the tube outer circumference, it is thought to be obvious that there will be little likelihood that the tube T would have a tendency to stick in any of the jaw sections when the jaw sections are expanded to release the tube.

Mounted in the fixed jaw section 51, adjacent each jaw section 52, are sets of stressed compression springs 56, 57 that are retained in suitable plate bores by screw plugs 58. These compression springs 56, 57 continuously exert forces on the pivotally mounted jaw plates 42, 48 tending to separate the plates 42, 48 from the fixed plate 51 and thereby release the tube T from the surrounding jaw sections 44, 49, 52. The opening and closing of the pivotally mounted jaw sections 44, 49 is timed in relation to the cutting periods of the disc cutters 31, 32, 33 by means of eccentrically mounted cams 61 carried by the main drive shaft 17. It has previously been explained that the gear train shown in Fig. 7 times the cutters 31, 32, 33 with the rotation of the drive shaft 17. Cams 61 on drive shaft 17 are shaped so that they will force the jaw sections 44, 49 into tube gripping engagement with the fixed jaw section 52 during the entire time the blades of the cutter discs 31, 32, 33 are passing through the tube T and then immediately release the gripping of the tube T when the cutting process is completed.

In order to provide some resilience in the gripping jaws 44, 49, so as to take care of slight variations in tube size, and to also cushion the action of the cams 61 on the jaws 44, 49, follower lever arms 63, having rubber press pads 64, are interposed between the drive shaft cams 61 and the jaw plates 42, 48. Followers 63 are pivotally mounted at their lower ends on pivot pins 65 carried by the jaw plate 48. The upper ends of the followers 63 have rollers 66 that engage the cams 61. Mounted on the followers 63 adjacent the rollers 66 are the rubber press pads 64 that transmit the contour of the cam faces to the free ends of the pivotally mounted jaw plates 42, 48. Accordingly, some limited relative movement is possible between the jaw sections 44, 49 and the compressible resilient press pads 64 so as to insure a firm but safe grip of all tubes even though there may be some size variations.

Figure 12:
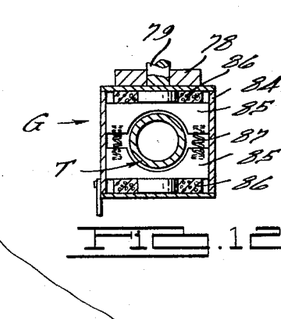
Fig. 12 is a sectional elevational view to an enlarged scale taken on line 12—12 of Fig. 3.

While the description herebefore has described the tube cutting means 31, 32, 33 and the operating means therefor and also the tube clamping jaws J, J and the operating means therefor, still, another important part of this invention is the tube feeding means F for accurately inserting the desired length of tube stock into position between the aforementioned cutting and clamping mechanism. Figs. 1, 3 and 12 are thought to clearly demonstrate one form of tube feeding device that forms a part of this invention. From Fig. 3 it will be noted that the main drive shaft 17 has a bevel gear 71 drivingly connected thereto which gear meshes with another, right angularly disposed bevel gear 72. Bevel gear 72 is drivingly connected to a shaft 73 that is journaled in spaced bearings 74. Shaft 73 has fixed to one end thereof the flywheel 75. Flywheel 75 carries a screw 76 on which is adjustably mounted a crank arm connection 77. Pivotally mounted on the connetcion 77 is one end of a pitman crank 78. The other end of the crank 78 is pivotally connected at 79 to a frame strip 81 that has fixed to its opposite ends a pair of tube grippers G, G. The tube grippers G, G may be either electrically, pneumatically or hydraulically operated. In the case shown the grippers G, G are electromagnetic clutches that have their energization controlled by the rotation of the flywheel 75.

Fig. 12 shows a section across one of the clutches G. Clutch G includes a casing 84 having movably mounted therein a pair of jaw elements 85 each of which has a semi-cylindrical opening to matingly receive a half section of a tube. Each jaw element has a coil winding 86 associated therewith such that energization of the windings causes the jaw elements 85 to move towards one another and clampings engage the tube T therebetween. While the frame strip 81 is shown as having a pair of the gripper clutches G, G mounted thereon it is obvious that in some cases either one or more of these gripper clutches can be used.

Control of the energization of the gripper clutches G, G is accomplished through the use of a radially, projecting finger 90 on the periphery of the flywheel 75. Flywheel finger 90 will engage and close an electrical circuit contact 91 when the frame 81 is at one end of its stroke whereby the grippers G, G will clampingly engage the tube T and shift it leftward for the full stroke of the frame 81 or any part thereof depending on the position of the electrical circuit contact 92. When flywheel finger 90 engages the contact 92 the circuit controlling energization of the gripper clutches G, G is broken and the tube T is released. At this time the tube clamping jaws J, J have been pressed into engagement with the tube T and the cutting process is about to be initated. As grippers G, G have been de-energized by the opening of the contact 92, it is obvious that the frame 81 and its clutches G, G may be moved rightwardly for the remainder of the cycle without effecting movement of the tube T. As the flywheel finger 90 approaches the contact 91 the cycle is about to be repeated and another length of tube will then be picked up and advanced into the cutting machine. As all operations are driven off the main drive shaft 17, it is thought to be clear that it is a simple matter to coordinate the various operations so that accurate lengths of tube will be continuously cut at a high rate of speed.

A particular feature of the tube feeding mechanism F is that it insures the feeding of accurate lengths of tubing at all times. This results from the use of the pitman arm actuated feeding mechanism 75—81 in combination with the grippers G, G. Because the flywheel crank 77 and the tube feed jaws G, G are positioned such that initial engagement and gripping of the tube T for feed to the cutters 31–33 occurs at a point of zero acceleration of the flywheel crank 77, there is no slip between the grippers G, G and the tube T when feed is initiated. Likewise, because the flywheel finger 90 causes de-energization of the gripping clutches G, G at a point of zero deceleration of the flywheel crank arm 77, it is very easy to cause instantaneous gripping of the tube T by the clamping jaws J, J at substantially the moment the tube feeding gripper jaws G, G release the tube T. As a result very accurate lengths of the tube stock T are fed into the jaws J, J and this results in high accuracy in the lengths of tubing successively cut by the rotary cutters 31–33. The particular type of tube feeding mechanism F herein disclosed completely eliminates positioning stops and limit switches and other types of controls that are a source of frequent trouble in a machine of this type. Furthermore, the feeding mechanism F is simple and accurate in operation and lends itself to control by the main drive shaft 17. A tube support 94 is positioned at the right end of the machine bed plate 47 to support the tube T during feeding and to relieve the grippers G, G of any drag loads that might interfere with accurate tube length feeding.

The three cutter arrangement shown in Figs. 6 and 6a is preferred because the cutters work to counteract tube rotation and because the top and bottom of the tube T are both sliced before the punch 32a is pressed through the tube to complete the tube severing operation. By this arrangement the punch 32a does not have to be forced through the bottom of the tube and a fast, clean cut is assured. However, with relatively thin walled tubing or with certain types of relatively soft tubing materials a single cutter and single punch may be used quite satisfactorily. Such an arrangement is shown in the modified form of this invention shown in Figs. 9, 10 and 11.

In this form of the invention the drive shaft 17 carries the gear 28 that is meshed with the timing gear 27 that is drivingly mounted on the countershaft 27a. Countershaft 27a also mounts a cam 95 that is used for tube feeding purposes as will subsequently become quite apparent. Also meshed with the drive shaft mounted gear 28 is the timing gear 96. Timing gear 96 has fixed thereto a cam 97 that is also used for tube feeding purposes as will be subsequently explained. Timing gear 96 is meshed with an idler gear 98 that is in turn meshed with the gear 25 on shaft 25a. Shaft 25a also mounts the cutter disc 31 that carries the cutter blade 31a. Blade 31a is arranged to slice a notch across the top of tube T, as previously explained, through which the punch 32a can then pass in its operation of severing the tube T. The three piece clamping jaws J, J shown in Figs. 9–11 are identical to those described in detail with respect to the Fig. 5 form of this invention.

In addition to showing a two cutter arrangement, Figs.

9–11 show a different type of tube stock feeding mechanism from that shown at F in Figs. 1 and 3. The Figs. 9–11 form of this invention disclose a magazine type of tube stock feed wherein the tube stock T to be cut is arranged in side-by-side relationship in an inclined chute 100. Assuming the punch 32a has just severed the tube T that is being firmly held in the clamping jaws J, J as shown in Fig. 9, then as the shaft 17 continues to rotate the cam 95 on shaft 27a will be turned to a position where a low spot thereon engages the follower face 48a on the pivotally mounted lower jaw plate 48. At this time the precompressed spring 101 will urge the jaw plate 48 outwardly in a counterclockwise direction and a discharge chute 102 will be opened up in the lower side of the jaws J, J into which the cut tube T will be deposited. Fig. 10 shows the relationship of the various clamping jaw elements at the indicated position of the punch 32a when the tube T is being deposited in the discharge chute 102. At the bottom of the discharge chute 102 is a conveyor track 103 that will carry the cut tubes to their next destination.

Figure 10:
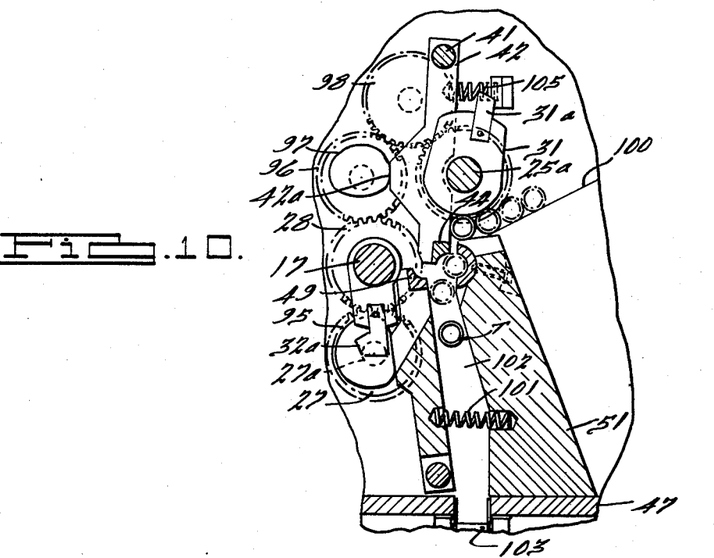
Figs. 10 and 11 are sectional views, similar to Fig. 9, but showing the mechanism of Fig. 9 in two other positions.
Figure 11:
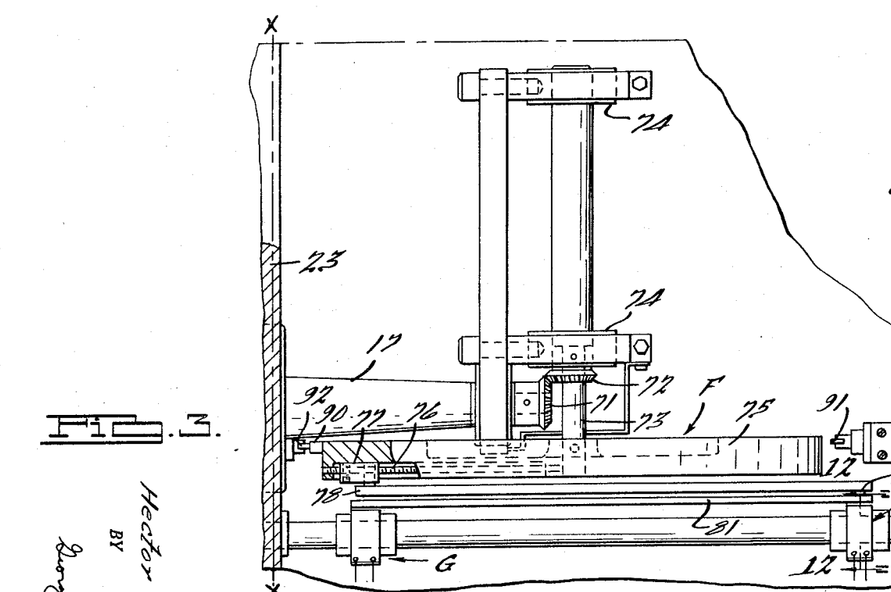

Looking at Fig. 10 it will be seen that the lower jaw plate 48 is now engaged with the lowest point on cam 95 so that the spring 101 has opened jaw plate 48 to its maximum. After this time the cam 95 will begin to close jaw plate 48 while the cam 97 will just be starting to bring its low portion into engagement with the follower face 42a on pivotally mounted upper jaw plate 42. Accordingly, precompressed spring 105 will now begin to swing the upper jaw plate 42 to open position. Upper jaw plate 42 can not fully open up until after lower jaw plate 48 has been moved back considerably towards its closed position or else tubes T would be discharged directly from the magazine 100 into the discharge chute 102 without being cut.

Fig. 11 shows a later stage in the feeding cycle where the upper jaw plate 42 has already opened up to its maximum to permit a new piece of tube stock T to roll into the cradle formed by the substantially closed lower jaw sections 49, 52. Cam 97 will thereafter close the upper jaw section 44 about the tube T and the tube will then be firmly held during the entire cutting operation. The timing is such that only about 60° of rotation are required for the cutting operation so there is ample time for the tube feeding operation.

Figure 13:
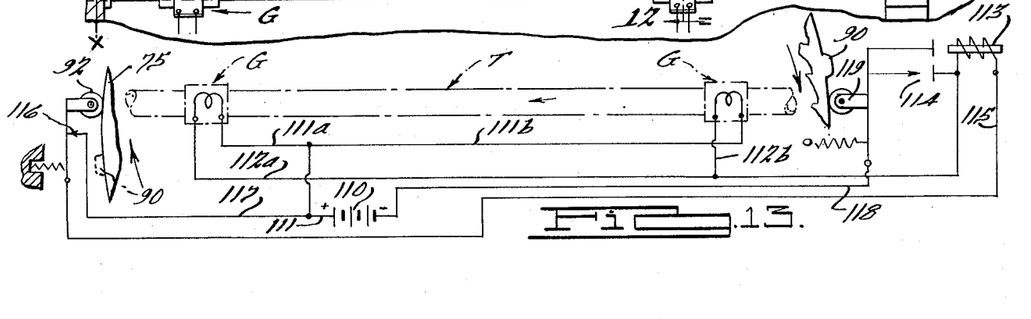
Fig. 13 is a wiring diagram for the control of the feed mechanism electromagnetic clutches shown in Figs. 1 and 3.

Fig. 13 shows a wiring diagram for the control of the electromagnetic clutches G, G of the feed mechanism F shown in the Figs. 1–8 form of the invention. In this diagram the electrical source, which is shown as a battery in this instance, is denoted 110. The positive terminal of battery 110 is connected by conductors 111, 111a and 111b to the electromagnetic clutches G, G. Conductors 112a and 112b which are connected to clutches G, G are also connected to the conductor 112 which is connected to the normally open cam operated switch 114 for the holding coil 113. Coil 113 is arranged to be energized so that it may hold switch contacts 114 closed during the tube feeding portions of the cycle. Holding coil 113 is connected by the conductor 115 to the normally closed cam operated switch 116 which is connected by the conductor 117 to the conductor 111. Circuit energizing switch 114 is connected by a conductor 118 to the negative terminal of the power source 110. One contact of switch 114 is connected by an actuator 119 to the plunger 120 of the holding coil 113.

When cam finger 90 on flywheel 75 engages and momentarily closes the switch contacts 114 by engaging the follower 91, a circuit is closed energizing the holding coil 113 which circuit then maintains contacts 114 closed until the cam finger 90 subsequently engages the follower roller 92. During the period this circuit is energized the gripper clutches G, G engage the tube T and advance it into the opened clamping jaws J, J. When cam finger 90 engages the roller 92 and opens switch 116 then the holding coil 113 is deenergized and clutches G, G are released from the tube T and returned to their outward position to subsequently pick up the next length of tubing for feed to the clamping jaws J, J. It is thought to be obvious that the holding coil circuit remains deenergized while the flywheel cam is moving from follower 92 to the follower 91. While this wiring diagram is shown as controlling electromagnetic clutches, still, it could be that this circuit could control valving for either pneumatic or hydraulically operated tubing mechanism the equivalent of the clutches G, G.

While this invention has been described with respect to a single cutter station machine, it is thought to be obvious that several cutters could be located at different stations lengthwise of the machine. Also, while the invention has been described with respect to a machine for cutting hollow tubes or pipe, still, it is forseeable that the entire invention or parts thereof can be applied to other types of machines and therefore there is no intention to limit the invention except as set forth in the appended claims.

I claim:

1. In a tube severing machine, a first shaft, a pair of additional shafts parallel to said first shaft and laterally spaced therefrom, means positively and drivingly connecting for rotation in opposite directions each of said additional shafts with said first shaft, means for fixedly positioning a piece of tube stock substantially centrally between said pair of additional shafts, each of said shafts being mounted for rotation about a fixed axis, a cutter blade having a leading edge fixedly mounted on each of said additional shafts in such position that said leading edges will substantially simultaneously engage said tube stock and simultaneously cut through opposite side portions thereof thereby reducing forces tending to rotate the tube stock, a punch blade having outwardly and rearwardly sloping side edges fixedly mounted on said first shaft in such position that said punch blade will engage one of said cut portions of said tube stock substantially centrally thereof after said cutter blades have passed through said tube stock and cut through the remaining portion of said tube stock, and means for driving at least one of said shafts.

2. In a tube severing machine, a first shaft, a pair of additional shafts parallel to said first shaft and laterally spaced therefrom, means positively and drivingly connecting for rotation each of said additional shafts in timed relationship with said first shaft, means for fixedly positioning a piece of tube stock between said shafts, each of said shafts being mounted for rotation about a fixed axis, a cutter blade having a leading edge, fixedly mounted on each of said additional shafts in such position that said leading edges will engage said tube stock and cut through opposite side portions thereof, a punch blade fixedly mounted on said first shaft in such position that said punch blade will engage one of said cut portions of said tube stock after said cutter blades have passed through said tube stock and cut through the remaining uncut portion of said tube stock, and means for driving at least one of said shafts.

3. In a tube severing machine, a first shaft, a pair of additional shafts parallel to said first shaft and laterally spaced therefrom, means positively and drivingly connecting for rotation each of said additional shafts in timed relationship with said first shaft, means for fixedly positioning a piece of tube stock between said shafts, each of said shafts being mounted for rotation about a fixed axis, a cutter disc with a plurality of circumferentially spaced, variable length blades, each having a leading edge, fixedly mounted on each of said additional shafts in such position that said leading edges will engage said tube stock and cut through opposite side portions thereof, a punch blade fixedly mounted on said first shaft in such position that said punch blade will engage one of said cut portions of said tube stock after said cutter blades have passed through said tube stock and cut through the remaining uncut portion of said tube stock, and means for driving at least one of said shafts.

4. In a tube severing machine, a first shaft, a pair of additional shafts parallel to said first shaft and laterally spaced therefrom, means positively and drivingly connecting for rotation in opposite directions each of said additional shafts with said first shaft, means for fixedly positioning a piece of tube stock substantially centrally between said pair of additional shafts, each of said shafts being mounted for rotation about a fixed axis, a cutter blade having a leading edge fixedly mounted on each of said additional shafts in such position that said leading edges will substantially simultaneously engage said tube stock and simultaneously cut through opposite side portions thereof thereby reducing forces tending to rotate the tube stock, a punch blade having outwardly and rearwardly sloping side edges fixedly mounted on said first shaft in such position that said punch blade will engage one of said cut portions of said tube stock substantially centrally thereof after said cutter blades have passed through said tube stock and cut through the remaining portion of said tube stock, means for driving at least one of said shafts, and means for feeding said tube stock to said fixed position for the subsequent severing thereof drivingly operated by and in timed relation with one of said shafts.

5. In a tube severing machine, a first shaft, a pair of additional shafts parallel to said first shaft and laterally spaced therefrom, means positively and drivingly connecting for rotation in opposite directions each of said additional shafts with said first shaft, means for fixedly positioning a piece of tube stock substantially centrally between said pair of additional shafts comprising movable clamping jaws actuated by and in timed relation to one of said shafts, each of said shafts being mounted for rotation about a fixed axis, a cutter blade having a leading edge fixedly mounted on each of said additional shafts in such position that said leading edges will substantially simultaneously engage said tube stock and simultaneously cut through opposite side portions thereof thereby reducing forces tending to rotate the tube stock, a punch blade having outwardly and rearwardly sloping side edges fixedly mounted on said first shaft in such position that said punch blade will engage one of said cut portions of said tube stock substantially centrally thereof after said cutter blades have passed through said tube stock and cut through the remaining portion of said tube stock, and means for driving at least one of said shafts.

References Cited in the file of this patent

UNITED STATES PATENTS

| | | |
|---|---|---|
| Re. 22,114 | Borzym | June 16, 1942 |
| 356,539 | Jackson | Jan. 25, 1887 |
| 460,695 | White | Oct. 6, 1891 |
| 583,002 | Satterwhite | May 18, 1897 |
| 1,235,277 | Alexander | July 31, 1917 |
| 1,541,715 | Johnson | July 31, 1917 |
| 1,911,297 | Balton | May 30, 1933 |
| 1,930,295 | Von Henke | Oct. 10, 1933 |
| 2,018,523 | Hogg | Oct. 22, 1935 |
| 2,203,255 | Deane | June 4, 1940 |
| 2,243,614 | Vogel | May 27, 1941 |
| 2,250,931 | Grieder | July 29, 1941 |
| 2,272,179 | Allardt | Feb. 10, 1942 |
| 2,318,566 | Wright | May 4, 1943 |
| 2,326,463 | Johnston | Aug. 10, 1943 |
| 2,484,601 | Abbey | Oct. 11, 1949 |
| 2,495,885 | Blume | Jan. 31, 1950 |
| 2,572,137 | Grieder | Oct. 23, 1951 |
| 2,602,213 | Winchell | July 8, 1952 |
| 2,620,030 | Anderson | Dec. 2, 1952 |
| 2,777,520 | Grzenkowski | Jan. 15, 1957 |